US012760168B2

(12) United States Patent
Li et al.

(10) Patent No.: US 12,760,168 B2
(45) **Date of Patent: *Oct. 13, 2026**

(54) DUAL-FUNCTION MELT ADDITIVES

(71) Applicant: 3M INNOVATIVE PROPERTIES COMPANY, St. Paul, MN (US)

(72) Inventors: Fuming B. Li, Woodbury, MN (US); Nathan E. Schultz, Woodbury, MN (US); John M. Brandner, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 659 days.

This patent is subject to a terminal disclaimer.

(21) Appl. No.: 17/762,782

(22) PCT Filed: Oct. 15, 2020

(86) PCT No.: PCT/IB2020/059732

§ 371 (c)(1), (2) Date: Mar. 23, 2022

(87) PCT Pub. No.: WO2021/074863

PCT Pub. Date: Apr. 22, 2021

(65) Prior Publication Data

US 2022/0380574 A1 Dec. 1, 2022

Related U.S. Application Data

(60) Provisional application No. 62/915,794, filed on Oct. 16, 2019.

(51) Int. Cl.

| | |
|---|---|
| ***C08K 5/3475*** | (2006.01) |
| ***B01D 39/16*** | (2006.01) |
| ***B03C 3/28*** | (2006.01) |
| ***C08J 5/18*** | (2006.01) |
| ***C08K 5/3477*** | (2006.01) |
| ***C08K 5/47*** | (2006.01) |
| ***D04H 3/007*** | (2012.01) |
| ***D04H 3/16*** | (2006.01) |
| ***D06M 10/02*** | (2006.01) |
| ***D06M 101/18*** | (2006.01) |

(52) U.S. Cl.

CPC .......... *C08K 5/3475* (2013.01); *B01D 39/163* (2013.01); *B03C 3/28* (2013.01); *C08J 5/18* (2013.01); *C08K 5/3477* (2013.01); *C08K 5/47* (2013.01); *D04H 3/007* (2013.01); *D04H 3/16* (2013.01); *D06M 10/025* (2013.01); *B01D 2239/0435* (2013.01); *B01D 2239/0442* (2013.01); *B01D 2239/0622* (2013.01); *C08J 2323/12* (2013.01); *D06M 2101/18* (2013.01); *D10B 2505/04* (2013.01)

(58) Field of Classification Search

None

See application file for complete search history.

(56) References Cited

U.S. PATENT DOCUMENTS

| | | | | |
|---|---|---|---|---|
| 3,049,509 A * | 8/1962 | Hardy | .................. | C07D 277/66 524/93 |
| 3,971,373 A | 7/1976 | Braun | | |
| 4,100,324 A | 7/1978 | Anderson | | |
| 4,118,531 A | 10/1978 | Hauser | | |
| 4,215,682 A | 8/1980 | Kubik | | |
| 4,264,750 A | 4/1981 | Anand | | |
| RE30,782 E | 10/1981 | van Turnhout | | |
| 4,340,563 A | 7/1982 | Appel | | |
| 4,375,718 A | 3/1983 | Wadsworth | | |
| RE31,285 E | 6/1983 | van Turnhout | | |
| 4,429,001 A | 1/1984 | Kolpin | | |
| 4,508,781 A | 4/1985 | Yagi | | |
| 4,557,945 A | 12/1985 | Yagi | | |
| 4,588,537 A | 5/1986 | Klaase | | |
| RE32,171 E | 6/1986 | van Turnhout | | |
| 4,592,815 A | 6/1986 | Nakao | | |
| 4,652,282 A | 3/1987 | Ohmori | | |
| 4,789,504 A | 12/1988 | Ohmori | | |
| 4,874,659 A | 10/1989 | Ando | | |
| 5,057,710 A | 10/1991 | Nishiura | | |
| 5,401,446 A | 3/1995 | Tsai | | |
| 5,496,507 A | 3/1996 | Angadjivand | | |
| 5,871,845 A | 2/1999 | Dahringer | | |
| 5,908,598 A | 6/1999 | Rousseau | | |
| 5,914,186 A | 6/1999 | Yau | | |
| 5,919,847 A | 7/1999 | Rousseau | | |
| 5,968,635 A | 10/1999 | Rousseau | | |
| 5,976,208 A | 11/1999 | Rousseau | | |
| 6,213,122 B1 | 4/2001 | Rousseau | | |
| 6,214,094 B1 | 4/2001 | Rousseau | | |
| 6,238,466 B1 | 5/2001 | Rousseau | | |
| 6,268,495 B1 | 7/2001 | Rousseau | | |
| 6,365,088 B1 | 4/2002 | Knight | | |
| 6,375,886 B1 | 4/2002 | Angadjivand | | |
| 6,397,458 B1 | 6/2002 | Jones | | |
| 6,398,847 B1 | 6/2002 | Jones | | |
| 6,406,657 B1 | 6/2002 | Eitzman | | |

(Continued)

FOREIGN PATENT DOCUMENTS

| | | |
|---|---|---|
| DE | 299471 | 4/1992 |
| EP | 0447166 | 9/1991 |

(Continued)

OTHER PUBLICATIONS

Database WPI Week 201240, Thomson Scientific, AN 2011—K64358, XP002801375.

(Continued)

*Primary Examiner* — Satya B Sastri

(74) *Attorney, Agent, or Firm* — Jeffrey M. Olofson

(57) ABSTRACT

Charged polymeric webs, such as electret webs, include a thermoplastic resin and a charge-enhancing additive. The charge-enhancing additive is a dual-function charge-enhancing additive that enhances the charge of the electret and also has anti-microbial properties. The additives are substituted-benzimidazole or substituted-benzothiazole compounds. The electret webs may be a non-woven fibrous web or a film. The electret webs are suitable for use as filter media.

15 Claims, No Drawings

(56) References Cited

U.S. PATENT DOCUMENTS

| | | | | |
|---|---|---|---|---|
| 6,409,806 | B1 | 6/2002 | Jones | |
| 6,419,871 | B1 | 7/2002 | Ogale | |
| 6,432,175 | B1 | 8/2002 | Jones | |
| 6,454,986 | B1 | 9/2002 | Eitzman | |
| 6,524,488 | B1 | 2/2003 | Insley | |
| 6,562,112 | B2 | 5/2003 | Jones | |
| 6,660,210 | B2 | 12/2003 | Jones | |
| 6,743,464 | B1 | 6/2004 | Insley | |
| 6,808,551 | B2 | 10/2004 | Jones | |
| 6,824,718 | B2 | 11/2004 | Eitzman | |
| 7,244,291 | B2 | 7/2007 | Spartz | |
| 7,244,292 | B2 | 7/2007 | Kirk | |
| 7,390,351 | B2 | 6/2008 | Leir | |
| 7,765,698 | B2 | 8/2010 | Sebastian | |
| 8,162,153 | B2 | 4/2012 | Fox | |
| 9,815,068 | B2 | 11/2017 | Schultz | |
| 10,240,269 | B2 | 3/2019 | Schultz | |
| 10,724,171 | B2 * | 7/2020 | Schultz | B01D 39/1623 |
| 2002/0174869 | A1 | 11/2002 | Gahan | |
| 2003/0134515 | A1 | 7/2003 | David | |
| 2008/0038976 | A1 | 2/2008 | Berrigan | |
| 2011/0290119 | A1 * | 12/2011 | Ylitalo | A61K 45/06 427/532 |
| 2015/0343455 | A1 * | 12/2015 | Schultz | C08K 5/378 96/15 |

FOREIGN PATENT DOCUMENTS

| | | |
|---|---|---|
| EP | 0623941 | 11/1994 |
| GB | 1512243 | 5/1978 |
| JP | 06254319 | 9/1994 |
| JP | 08284063 | 10/1996 |
| KR | 20110075980 | 7/2011 |
| WO | WO 1993-014510 | 7/1993 |
| WO | WO 2009-148744 | 12/2009 |
| WO | WO 2009-148747 | 12/2009 |
| WO | WO 2015-199972 | 12/2015 |
| WO | WO 2017-007675 | 1/2017 |

OTHER PUBLICATIONS

Davies, "The Separation of Airborne Dust and Particles", Institution of Mechanical Engineers, Proceedings 1B, 1953, pp. 185-213.

Wente, "Manufacture of Super Fine Organic Fibers", Report No. 4364 of the Naval Research Laboratories, 1954, pp. 1-19.

Wente, "Superfine Thermoplastic Fibers", Industrial And Engineering Chemistry, 1956, vol. 48, No. 08, pp. 1342-1346.

International Search Report for PCT International Application No. PCT/IB2020/059732, mailed on Dec. 18, 2020, 5 pages.

* cited by examiner

DUAL-FUNCTION MELT ADDITIVES

FIELD OF THE DISCLOSURE

This disclosure relates to electret webs, including non-woven fibrous webs such as non-woven thermoplastic microfiber webs, containing dual-function charge-enhancing additives that are charge-enhancing additives and antimicrobial agents, and uses thereof.

BACKGROUND

An electret is a dielectric material that exhibits a quasi-permanent electrical charge. Electrets are useful in a variety of devices including, e.g. cling films, air filters, filtering facepieces, and respirators, and as electrostatic elements in electro-acoustic devices such as microphones, headphones, and electrostatic recorders.

The performance of microfibrous webs used for aerosol filtration can be improved by imparting an electrical charge to the fibers, forming an electret material. In particular, electrets are effective in enhancing particle capture in aerosol filters. A number of methods are known for forming electret materials in microfibrous webs. Such methods include, for example, bombarding melt-blown fibers as they issue from the die orifices, as the fibers are formed, with electrically charged particles such as electrons or ions. Other methods include, for example, charging the fibers after the web is formed, by means of a corona discharge or imparting a charge to the fiber mat by means of carding and/or needle tacking (tribocharging). In addition, a method in which jets of water or a stream of water droplets impinge on a non-woven web at a pressure sufficient to provide filtration enhancing electret charge has also been described (hydro-charging).

A number of materials have been added to polymeric compositions to modify the properties of the polymeric composition. For example, in U.S. Pat. No. 5,914,186 (Yau et al.), heat-resistant anti-static pressure sensitive adhesive tapes are described that comprise a substrate coated with a microparticle adhesive having a diameter of at least 1 micrometer. The microparticles have a conductive coating formed from a polymer electrolyte base polymer, at least one ionic salt of an alkali or alkaline earth metal, and at least one thermal stabilizer selected from the group consisting of hindered amines, salts of substituted toluimidazoles, and mixtures thereof.

A variety of charge-enhancing additives have been developed for use in electret materials. U.S. Pat. No. 9,815,068 describes electret webs that include a thermoplastic resin and a charge-enhancing additive, where the charge-enhancing additive is a divalent metal-containing sub stituted-mercaptobenzimidazolate salt. U.S. Pat. No. 10,240,269 describes electret webs include a thermoplastic resin and a charge-enhancing additive, where the charge-enhancing additive is a fused aromatic thiourea, a fused aromatic urea compound, or a combination thereof. The change-enhancing additive may also include a hindered amine light stabilizer compound.

Examples of electrets that have additives added include electrets with antibacterial additives as described in Japanese Patent Publication JP 08284063 which describes N-n-butylcarbamic acid 3-9 iodo-2-propynyl ester containing either an amidine or guanidine group, and 2-(4-thiazolyl) benzimidazole, and PCT Publication WO 93/14510 which describes hindered amine compounds, nitrogenous hindered phenol compounds, metallic salt hindered phenol compounds, phenol compounds, sulfur compounds, and phosphorous compounds. Japanese Patent Publication JP 06254319 describes the use of metal salts of long chain organic acids in polyolefin electrets to lessen the attenuation of the electrification quantity. European Patent Publication No. EP 623,941 describes the use of Charge Control Agents from various chemical classes in polymer electrets.

Also described are processes for producing high stability electrets, such as European Patent Publication No. EP 447,166 which describes a process for producing electrets comprising alternating at least two cycles of applying electric charge and subsequently heating, and also describes electrets containing polar high-molecular weight compounds, and U.S. Pat. No. 4,874,659 (Ando et al.) which describes a process comprising placing a fiber sheet between a non-contact voltage-applied electrode and an earth electrode and supplying electricity between the electrodes.

SUMMARY

This disclosure relates to electret webs, including non-woven fibrous webs such as non-woven thermoplastic microfiber webs, containing dual-function charge-enhancing additives that are charge-enhancing additives and antimicrobial agents, and uses thereof.

Among the uses are electret filter media.

In some embodiments, the electret web comprises a thermoplastic resin, and a charge-enhancing additive comprising substituted-benzimidazole compound with the general structure of Formula 1:

Formula I

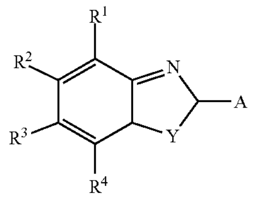

where Y is an NH or S group, and where the groups $R^1$, $R^2$, $R^3$, and $R^4$ independently comprise a hydrogen atom, an alkyl, an aryl, or a substituted alkyl, and A comprises a substituted 6-membered aromatic group or a substituted or unsubstituted heterocyclic aromatic 6-membered ring group. The electret web has anti-microbial properties.

In some embodiments of Formula 1, Y comprises NH, and the A group comprises a 6-membered cyclic or heterocyclic aromatic group described by the general structure of Formula 2:

Formula 2

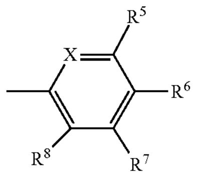

where X comprises: a —C—$R^9$ group, wherein $R^9$ comprises a hydroxy group; or a nitrogen atom. In Formula 2, each $R^5$, $R^6$, $R^7$, and $R^8$ independently comprises a hydrogen atom, an alkyl, an aryl, or a substituted alkyl.

In other embodiments of Formula 1, Y comprises S, and the A group comprises a 6-membered cyclic or heterocyclic aromatic group described by the general structure of Formula 2:

Formula 2

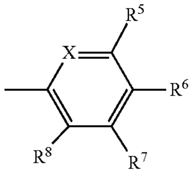

where X comprises: a —C—$R^9$ group, wherein $R^9$ comprises a hydroxy group. In Formula 2, each $R^5$, $R^6$, $R^7$, and $R^8$ independently comprises a hydrogen atom, an alkyl, an aryl, or a substituted alkyl.

DETAILED DESCRIPTION

The need remains for electret webs with improved properties. Presented in this disclosure are electret webs containing charge-enhancing additives. These charge-enhancing additives provide electret webs that are easy to charge by a variety of different charging mechanisms such as tribocharging, corona discharge, hydrocharging or a combination thereof. In some embodiments, the electret webs of this disclosure are capable of being charged by corona discharge alone, particularly DC corona discharge, without the need for additional charging mechanisms.

Electret webs useful in the present disclosure include a blend of a thermoplastic resin and a dual-function charge-enhancing additive. Webs prepared from such blends can show enhanced properties over webs prepared with the thermoplastic resins alone. Additionally, the charge-enhancing additives also provide anti-microbial properties to the electret webs. Useful charge-enhancing additives include substituted benzimidazoles and substituted benzothiazoles. It has been found that hydroxyl-substituted phenyl groups are particularly useful substituents for benzimidazoles and benzothiazoles. Additionally, pyridyl-substituted benzimidazole has been found to be useful.

The electret webs may be in a variety of forms. For example, the web may be a continuous or discontinuous film, or a fibrous web. Fibrous webs are particularly useful for the formation of filtration medium. In some embodiments the web is a non-woven microfibrous web. Typically, microfibers are 1-100 micrometers, or more typically 2-30 micrometers in effective diameter (or average diameter if measured by a method such as scanning electron microscopy) and the microfibers need not have a circular cross-section.

The terms "a", "an", and "the" are used interchangeably with "at least one" to mean one or more of the elements being described.

The term "electret" refers to a material that exhibits a quasi-permanent electric charge.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl (t-butyl), n-pentyl, n-hexyl, cyclohexyl, n-heptyl, n-octyl, and ethylhexyl.

The term "heteroalkyl" refers to an alkyl group which contains heteroatoms. These heteroatoms may be pendant atoms, for example, halogens such as fluorine, chlorine, bromine, or iodine or catenary atoms such as nitrogen, oxygen or sulfur. An example of a heteroalkyl group is a polyoxyalkyl group such as $—CH_2CH_2(OCH_2CH_2)_n OCH_2CH_3$.

The term "substituted alkyl" refers to an alkyl group which contains substituents along the hydrocarbon backbone. These substituents may be alkyl groups, heteroalkyl groups or aryl groups. An example of a substituted alkyl group is a benzyl group.

The term "aryl" refers to an aromatic carbocyclic group that is a radical containing 1 to 5 rings which may be connected or fused. The aryl group may be substituted with alkyl or heteroalkyl groups. Examples of aryl groups include phenyl groups, naphthalene groups and anthracene groups.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The terms "room temperature" and "ambient temperature" are used interchangeably to mean temperatures in the range of 20° C. to 25° C.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Thermoplastic resins useful in the present disclosure include any thermoplastic nonconductive polymer capable of retaining a high quantity of trapped electrostatic charge when formed into a web and charged. Typically, such resins have a DC (direct current) resistivity of greater than $10^{14}$ ohm-cm at the temperature of intended use. Polymers capable of acquiring a trapped charge include polyolefins such as polypropylene, polyethylene, and poly-4-methyl-1-pentene; polyvinyl chloride; polystyrene; polycarbonates; polyesters, including polylactides; and perfluorinated polymers and copolymers. Particularly useful materials include polypropylene, poly-4-methyl-1-pentene, blends thereof or copolymers formed from at least one of propylene and 4-methyl-1-pentene.

Examples of suitable thermoplastic resins include, for example, the polypropylene resins: ESCORENE PP 3746G commercially available from Exxon-Mobil Corporation, Irving, TX; TOTAL PP3960, TOTAL PP3860, and TOTAL PP3868 commercially available from Total Petrochemicals USA Inc., Houston, TX; and METOCENE MF 650W commercially available from LyondellBasell Industries, Inc., Rotterdam, Netherlands; and the poly-4-methyl-1-pentene resin TPX-MX002 commercially available from Mitsui Chemicals, Inc., Tokyo, Japan.

The charge-enhancing additives are substituted-benzimidazole compounds. These compounds can be described by the general structure of Formula 1 shown below:

Formula I

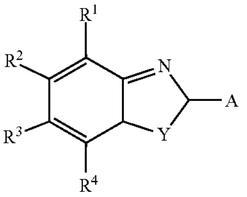

wherein Y is an NH or S group; the groups $R^1$, $R^2$, $R^3$, and $R^4$ independently comprise a hydrogen atom, an alkyl, an aryl, or a substituted alkyl; and A comprises a substituted 6-membered aromatic group or a substituted or unsubstituted heterocyclic aromatic 6-membered ring group.

In some embodiments, the A group of Formula 1 comprises a substituted 6-membered aromatic group described by the general structure of Formula 2 shown below:

Formula 2

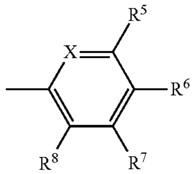

wherein X comprises: a —C—$R^9$ group, where $R^9$ comprises a hydroxy group; or a nitrogen atom; and each $R^5$, $R^6$, $R^7$, and $R^8$ independently comprises a hydrogen atom, an alkyl, an aryl, or a substituted alkyl.

In some embodiments, the charge-enhancing additive has the structure of Formula 1A below. This structure is of general Formula 1 where Y is an NH group, with an A group of general Formula 2, wherein X comprises a —C—$R^9$ group, wherein $R^9$ comprises a hydroxyl group; and each $R^5$, $R^6$, $R^7$, and $R^8$ comprises a hydrogen atom.

In some embodiments, the charge-enhancing additive has the structure of Formula 1B below. This structure is of general Formula 1 where Y is an NH group, with an A group of general Formula 2, wherein X comprises a nitrogen atom; and each $R^5$, $R^6$, $R^7$, and $R^8$ comprises a hydrogen atom.

In other embodiments, the charge-enhancing additive has the structure of Formula 1C below. This structure is of general Formula 1 where Y is an S group, with an A group of general Formula 2, wherein X comprises a —C—$R^9$ group, wherein $R^9$ comprises a hydroxyl group; and each $R^5$, $R^6$, $R^7$, and $R^8$ comprises a hydrogen atom.

Formula 1A

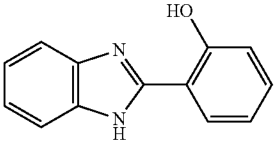

Formula 1B

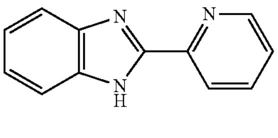

-continued

Formula 1C

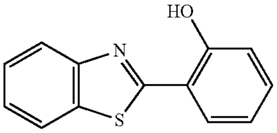

Combinations of charging additives of general Formula 1 may also be used.

It has been found that substitution on aromatic-functional benzoimidazoles result in the desired combination of charge-enhancing and anti-microbial properties. In the compound of Formula 1A the substituent group is a hydroxy group, in the compound of Formula 1B the substituent group is a nitrogen atom. It has been found that unsubstituted aromatic group-functional benzoimidazoles, such as the compound of Formula 1D, do not have this combination of properties.

Formula 1D

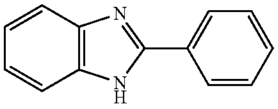

The charge-enhancing additive can be added in any suitable amount. The charge-enhancing additives of this disclosure have been shown to be effective even in relatively small quantities. Typically, the charge-enhancing additive is present in a thermoplastic resin and charge-enhancing additive blend in amounts of up to about 10% by weight, more typically in the range of 0.02 to 5% by weight based upon the total weight of the blend. In some embodiments, the charge-enhancing additive is present in an amount ranging from 0.1 to 3% by weight, 0.1 to 2% by weight, 0.2 to 1.0% by weight, or 0.25 to 0.5% by weight.

The blend of the thermoplastic resin and the charge-enhancing additive can be prepared by well-known methods. Typically, the blend is processed using melt extrusion techniques, so the blend may be preblended to form pellets in a batch process, or the thermoplastic resin and the charge-enhancing additive may be mixed in the extruder in a continuous process. Where a continuous process is used, the thermoplastic resin and the charge-enhancing additive may be pre-mixed as solids or added separately to the extruder and allowed to mix in the molten state.

Examples of melt mixers that may be used to form preblended pellets include those that provide dispersive mixing, distributive mixing, or a combination of dispersive and distributive mixing. Examples of batch methods include those using a BRABENDER (e. g. a BRABENDER PREP CENTER, commercially available from C.W. Brabender Instruments, Inc.; South Hackensack, NJ) or BANBURY internal mixing and roll milling equipment (e.g. equipment available from Farrel Co.; Ansonia, CT). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

Examples of extruders that may be used to extrude preblended pellets prepared by a batch process include the same types of equipment described above for continuous processing. Useful extrusion conditions are generally those which are suitable for extruding the resin without the additive.

The extruded blend of thermoplastic resin and charge-enhancing additive may be cast or coated into films or sheets or may be formed into a fibrous web using any suitable techniques. Films can be made into a variety of articles including filtration media by the methods described in, for example, U.S. Pat. No. 6,524,488 (Insley et al.). Fibrous webs can be made from a variety of fiber types including, for example, melt-blown microfibers, staple fibers, fibrillated films, and combinations thereof. Techniques for preparing fibrous webs include, for example, air laid processes, wet laid processes, hydro-entanglement, spunbond processes, melt-blown processes, and combinations thereof. Melt-blown and spunbond, non-woven microfibrous webs are particularly useful as filtration media.

Melt-blown and spunbond, non-woven microfibrous electret filters are especially useful as an air filter element of a respirator, such as a filtering facepiece, or for such purposes as home and industrial air-conditioners, air cleaners, vacuum cleaners, medical air line filters, and air conditioning systems for vehicles and common equipment, such as computers, computer disk drives and electronic equipment. In some embodiments, the electret filters are combined with a respirator assembly to form a respiratory device designed to be used by a person. In respirator uses, the electret filters may be in the form of molded, pleated, or folded half-face respirators, replaceable cartridges or canisters, or prefilters.

Melt-blown microfibers useful in the present disclosure can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al.

Spunbond microfibers may be formed using a spunbond process in which one or more continuous polymeric free-fibers are extruded onto a collector, as described, for example, in U.S. Pat. Nos. 4,340,563 and 8,162,153 and US Patent Publication No. 2008/0038976.

Useful melt-blown and spunbond microfibers for fibrous electret filters typically have an effective fiber diameter of from about 1-100 micrometers, more typically 2 to 30 micrometers, in some embodiments from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a loftier, less dense web than a web of only blown microfibers. Generally, no more than about 90 weight percent staple fibers are present, more typically no more than about 70 weight percent. Examples of webs containing staple fiber are disclosed in U.S. Pat. No. 4,118,531 (Hauser).

Sorbent particulate material such as activated carbon or alumina may also be included in the web. Such particles may be present in amounts up to about 80 volume percent of the contents of the web. Examples of particle-loaded webs are described, for example, in U.S. Pat. No. 3,971,373 (Braun), U.S. Pat. No. 4,100,324 (Anderson) and U.S. Pat. No. 4,429,001 (Kolpin et al.).

Various optional additives can be blended with the thermoplastic composition including, for example, pigments, light stabilizers, nucleating agents, primary and secondary antioxidants, metal deactivators, hindered amines, hindered phenols, fatty acid metal salts, triester phosphites, phosphoric acid salts, fluorine-containing compounds and combinations thereof. Particularly suitable additives include HALS (Hindered Amine Light Stabilizers) and antioxidants, as these may also act as charge-enhancing additives. In addition, other charge-enhancing additives may be combined with the thermoplastic composition. Possible charge additives include thermally stable organic triazine compounds or oligomers, which compounds, or oligomers contain at least one nitrogen atom in addition to those in the triazine ring, see, for example, U.S. Pat. Nos. 6,268,495, 5,976,208, 5,968,635, 5,919,847, and 5,908,598 to Rousseau et al. Another additive known to enhance electrets is "CHIMASSORB 944: (poly[[6-(1,1,3,3,-tetramethylbutyl) amino]-s-triazine-2,4-diyl][[(2,2,6,6-tetramethyl-4-piperidyl) imino] hexamethylene [(2,2,6,6-tetramethyl-4-piperidyl) imino]]), available from BASF, Ludwigshafen, Germany. The charge-enhancing additives may be N-substituted amino aromatic compounds, particularly tri-amino substituted compounds, such as 2,4,6-trianilino-p-(carbo-2'-ethylhexyl-1'-oxy)-1,3,5-triazine commercially available as "UVINUL T-150" from BASF, Ludwigshafen, Germany. Another charge additive is 2,4,6-tris-(octadecylamino)-triazine, also known as tristearyl melamine ("TSM"). Further examples of charge-enhancing additives are provided in U.S. Patent Application Ser. Nos. 61/058,029, 61/058,041, U.S. Pat. No. 7,390,351 (Leir et al.), U.S. Pat. No. 5,057,710 (Nishiura et al.), and U.S. Pat. Nos. 4,652,282 and 4,789,504 (Ohmori et al.).

In addition, the web may be treated to chemically modify its surface. Surface fluorination can be achieved by placing a polymeric article in an atmosphere that contains a fluorine-containing species and an inert gas and then applying an electrical discharge to modify the surface chemistry of the polymeric article. The electrical discharge may be in the form of a plasma such as an AC corona discharge. This plasma fluorination process causes fluorine atoms to become present on the surface of the polymeric article. The plasma fluorination process is described in a number of U.S. Pat. Nos. 6,397,458, 6,398,847, 6,409,806, 6,432,175, 6,562,112, 6,660,210, and 6,808,551 to Jones/Lyons et al. Electret articles that have a high fluorosaturation ratio are described in U.S. Pat. No. 7,244,291 to Spartz et al., and electret articles that have a low fluorosaturation ratio, in conjunction with heteroatoms, is described in U.S. Pat. No. 7,244,292 to Kirk et al. Other publications that disclose fluorination techniques include: U.S. Pat. Nos. 6,419,871, 6,238,466, 6,214,094, 6,213,122, 5,908,598, 4,557,945, 4,508,781, and 4,264,750; U.S. Publications US 2003/0134515 A1 and US 2002/0174869 A1; and International Publication WO 01/07144.

The electret filter media prepared according to the present disclosure generally have a basis weight (mass per unit area) in the range of about 10 to 500 $g/m^2$, and in some embodiments, about 10 to 100 $g/m^2$. In making melt-blown microfiber webs, the basis weight can be controlled, for example, by changing either the collector speed or the die throughput. The thickness of the filter medium is typically about 0.25 to 20 millimeters, and in some embodiments, about 0.5 to 2 millimeters. Multiple layers of fibrous electret webs are commonly used in filter elements. The solidity of the fibrous electret web typically is about 1% to 25%, more typically about 3% to 10%. Solidity is a unitless parameter that defines the solids fraction of the web. Generally, the methods of this disclosure provide electret webs with generally uniform charge distribution throughout the web without regard to basis weight, thickness, or solidity of the medium. The electret filter medium and the resin from which it is produced should not be subjected to any unnecessary treatment which might increase its electrical conductivity, e.g., exposure to ionizing radiation, gamma rays, ultraviolet irradiation, pyrolysis, oxidation, etc.

The electret web may be charged as it is formed, or the web may be charged after the web is formed. In electret filter medium, the medium is generally charged after the web is formed. In general, any standard charging method known in the art may be used. For example, charging may be carried out in a variety of ways, including tribocharging, corona discharge and hydrocharging. A combination of methods may also be used. As mentioned above, in some embodiments, the electret webs of this disclosure have the desirable feature of being capable of being charged by corona discharge alone, particularly DC corona discharge, without the need of additional charging methods.

Examples of suitable corona discharge processes are described in U.S. Pat. Re. No. 30,782 (van Turnhout), U.S. Pat. Re. No. 31,285 (van Turnhout), U.S. Pat. Re. No. 32,171 (van Turnhout), U.S. Pat. No. 4,215,682 (Davis et al.), U.S. Pat. No. 4,375,718 (Wadsworth et al.), U.S. Pat. No. 5,401,446 (Wadsworth et al.), U.S. Pat. No. 4,588,537 (Klaase et al.), U.S. Pat. No. 4,592,815 (Nakao), and U.S. Pat. No. 6,365,088 (Knight et al.).

Another technique that can be used to charge the electret web is hydrocharging. Hydrocharging of the web is carried out by contacting the fibers with water in a manner sufficient to impart a charge to the fibers, followed by drying of the web. One example of hydrocharging involves impinging jets of water or a stream of water droplets onto the web at a pressure sufficient to provide the web with filtration enhancing electret charge, and then drying the web. The pressure necessary to achieve optimum results varies depending on the type of sprayer used, the type of polymer from which the web is formed, the type and concentration of additives to the polymer, the thickness and density of the web and whether pre-treatment, such as corona surface treatment, was carried out prior to hydrocharging. Generally, water pressures in the range of about 10 to 500 psi (69 to 3450 kPa) are suitable. The jets of water or stream of water droplets can be provided by any suitable spray device. One example of a useful spray device is the apparatus used for hydraulically entangling fibers. An example of a suitable method of hydrocharging is described in U.S. Pat. No. 5,496,507 (Angadjivand et al.). Other methods are described in U.S. Pat. No. 6,824,718 (Eitzman et al.), U.S. Pat. No. 6,743,464 (Insley et al.), U.S. Pat. No. 6,454,986 (Eitzman et al.), U.S. Pat. No. 6,406,657 (Eitzman et al.), and U.S. Pat. No. 6,375,886 (Angadjivand et al.). The hydrocharging of the web may also be carried out using the method disclosed in the U.S. Pat. No. 7,765,698 (Sebastian et al.).

To assess filtration performance, a variety of filtration testing protocols has been developed. These tests include measurement of the aerosol penetration of the filter web using a standard challenge aerosol such as dioctylphthalate (DOP), which is usually presented as percent of aerosol penetration through the filter web (% Pen) and measurement of the pressure drop across the filter web (ΔP). From these two measurements, a quantity known as the Quality Factor (QF) may be calculated by the following equation:

$$QF=-\ln(\%\ Pen/100)/\Delta P,$$

where ln stands for the natural logarithm. A higher QF value indicates better filtration performance, and decreased QF values effectively correlate with decreased filtration performance. Details for measuring these values are presented in the Examples section. Typically, the filtration medium of this disclosure has measured QF values of 0.3 (mm of $H_2O)^{-1}$ or greater at a face velocity of 6.9 centimeters per second.

Besides the charge-enhancing properties, the charge-enhancing additives also provide anti-microbial properties. Antimicrobials are agents that kill microorganisms or stops their growth. Antimicrobials work at a cellular level to continually disrupt and prevent the growth of microorganisms. By creating an inhospitable environment for microorganisms like bacteria, mold and mildew, antimicrobials protect everyday products like countertops, toys, surface coatings, textiles and hospital equipment. The antimicrobial activity of the current charge-enhancing additives in electret webs can be measured in a variety of different ways. One particularly suitable measurement technique is the standard test method of "Modified AATCC Method 100—Assessment of Antibacterial Finishes on Textile Materials" was used for the nonwoven webs performance test. This method is used to evaluate the antibacterial activity of textile products treated with antibacterial finish, which is suitable for nonwoven hydrophobic fabric webs. Details of the test method are provided in the Examples section, below.

The disclosure includes the following embodiments:

Included are embodiments of electret webs. A first embodiment is an electret web comprising: a thermoplastic resin; and a charge-enhancing additive comprising substituted-benzimidazole compound with the general structure of Formula 1:

Formula 1

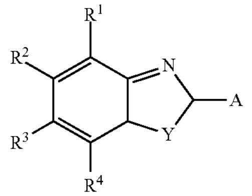

wherein Y is an NH or S group; and wherein the groups $R^1$, $R^2$, $R^3$, and $R^4$ independently comprise a hydrogen atom, an alkyl, an aryl, or a substituted alkyl; and A comprises a substituted 6-membered aromatic group or a substituted or unsubstituted heterocyclic aromatic 6-membered ring group; and wherein the electret web has anti-microbial properties.

Embodiment 2 is the electret web of embodiment 1, wherein the web comprises a non-woven fibrous web.

Embodiment 3 is the electret web of embodiment 1, wherein the web comprises a film.

Embodiment 4 is the electret web of any of embodiments 1-3, wherein Y comprises NH; and the A group of Formula 1 comprises a 6-membered cyclic or heterocyclic aromatic group described by the general structure of Formula 2:

Formula 2

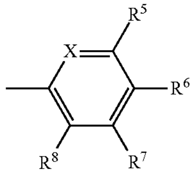

wherein X comprises: a —C—$R^9$ group, wherein $R^9$ comprises a hydroxy group; or a nitrogen atom; and each $R^5$, $R^6$, $R^7$, and $R^8$ independently comprises a hydrogen atom, an alkyl, an aryl, or a substituted alkyl.

Embodiment 5 is the electret web of embodiment 4, wherein X comprises: a —C—$R^9$ group, wherein $R^9$ comprises a hydrogen atom; and each $R^5$, $R^6$, $R^7$, and $R^8$ independently comprises a hydrogen atom.

Embodiment 6 is the electret web of embodiment 4, wherein X comprises: a —C—$R^9$ group, wherein $R^9$ comprises a hydroxyl group; and each $R^5$, $R^6$, $R^7$, and $R^8$ independently comprises a hydrogen atom.

Embodiment 7 is the electret web of embodiment 4, wherein X comprises: a nitrogen atom; and each $R^5$, $R^6$, $R^7$, and $R^8$ independently comprises a hydrogen atom.

Embodiment 8 is the electret web of any of embodiments 1-3, wherein the charge-enhancing additive is a compound of Formula 1: wherein Y is an S group; and the A group comprises a 6-membered aromatic group described by the general structure of Formula 2:

Formula 2

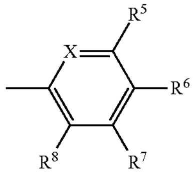

wherein X comprises: a —C—$R^9$ group, wherein $R^9$ comprises a hydroxy group; and each $R^5$, $R^6$, $R^7$, and $R^8$ independently comprises a hydrogen atom, an alkyl, an aryl, or a substituted alkyl.

Embodiment 9 is the electret web of any of embodiments 1-8, wherein the charge-enhancing additive comprises a compound of Formula 1A, Formula 1B, or Formula 1C:

Formula 1A

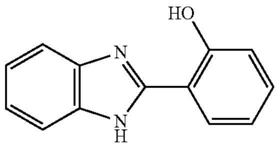

Formula 1B

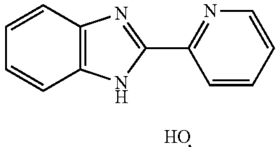

Formula 1C

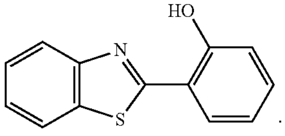

Embodiment 10 is the electret web of any of embodiments 1-9, wherein the thermoplastic resin comprises: polyolefin; polyvinyl chloride; polystyrene; polycarbonate; or polyester.

Embodiment 11 is the electret web of any of embodiments 1-10, wherein the charge-enhancing additive comprises 0.02-5.0% by weight of the web.

Embodiment 12 is the electret web of any of embodiments 1-11, wherein the web contains an electrostatic charge, wherein the charge is imparted through corona treatment, hydrocharging, or a combination thereof.

Embodiment 13 is the electret web of any of embodiments 1-12, wherein the web further comprises at least one additional additive selected from pigments, light stabilizers, nucleating agents, primary and secondary antioxidants, metal deactivators, hindered amines, hindered phenols, fatty acid metal salts, triester phosphites, phosphoric acid salts, fluorine-containing compounds and combinations thereof.

Also disclosed are electret filter media. Embodiment 14 is an electret filter medium comprising: a web comprising: a thermoplastic resin; and a charge-enhancing additive comprising substituted-benzimidazole compound with the general structure of Formula 1:

Formula 1

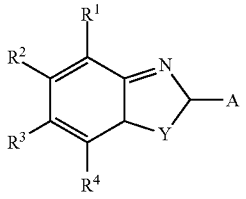

wherein Y is an NH or S group; and wherein the groups $R^1$, $R^2$, $R^3$, and $R^4$ independently comprise a hydrogen atom, an alkyl, an aryl, or a substituted alkyl; and A comprises a substituted 6-membered aromatic group or a substituted or unsubstituted heterocyclic aromatic 6-membered ring group; and wherein the electret filter media has anti-microbial properties.

Embodiment 15 is the electret filter medium of embodiment 14, wherein the charge-enhancing additive comprises a compound of Formula 1: wherein Y is an NH group; and the A group comprises a 6-membered aromatic group described by the general structure of Formula 2:

Formula 2

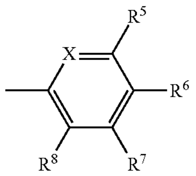

wherein X comprises: a —C—$R^9$ group, wherein $R^9$ comprises a hydroxy group; or a nitrogen atom; and each $R^5$, $R^6$, $R^7$, and $R^8$ independently comprises a hydrogen atom, an alkyl, an aryl, or a substituted alkyl.

Embodiment 16 is the electret filter medium of embodiment 15, wherein X comprises: a —C—$R^9$ group, wherein $R^9$ comprises a hydroxy group; and each $R^5$, $R^6$, $R^7$, and $R^8$ independently comprises a hydrogen atom.

Embodiment 17 is the electret filter medium of embodiment 15, wherein X comprises: a nitrogen atom; and each $R^5$, $R^6$, $R^7$, and $R^8$ independently comprises a hydrogen atom.

Embodiment 18 is the electret filter medium of embodiment 14, wherein the charge-enhancing additive is a compound of Formula 1: wherein Y is an S group; and the A group comprises a 6-membered aromatic group described by the general structure of Formula 2:

Formula 2

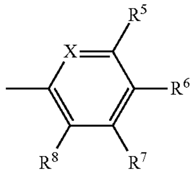

wherein X comprises: a —C—$R^9$ group, wherein $R^9$ comprises a hydroxy group; and each $R^5$, $R^6$, $R^7$, and $R^8$ independently comprises a hydrogen atom, an alkyl, an aryl, or a substituted alkyl.

Embodiment 19 is the electret filter medium of any embodiments 14-18, wherein the thermoplastic resin comprises: polyolefin; polyvinyl chloride; polystyrene; polycarbonate; or polyester.

Embodiment 20 is the electret filter medium of any embodiments 14-19, wherein the charge-enhancing additive comprises 0.02-5.0% by weight of the web.

Embodiment 21 is the electret filter medium of any embodiments 14-20, wherein the web contains an electrostatic charge, wherein the charge is imparted through corona treatment, hydrocharging, or a combination thereof.

Embodiment 22 is the electret filter medium of any embodiments 14-21, wherein the web further comprises at least one additional additive selected from pigments, light stabilizers, nucleating agents, primary and secondary antioxidants, metal deactivators, hindered amines, hindered phenols, fatty acid metal salts, triester phosphites, phosphoric acid salts, fluorine-containing compounds and combinations thereof.

Embodiment 23 is the electret filter medium of any embodiments 14-22, wherein the filter medium retains at least 65% filtration performance as measured by Quality Factor after aging for 72 hours at 71° C.

Embodiment 24 is the electret filter medium of any embodiments 14-23, wherein the charge-enhancing additive comprises at least one compound of Formula 1A, Formula 1B, or Formula 1C:

Formula 1A

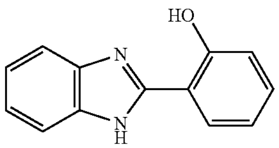

Formula 1B

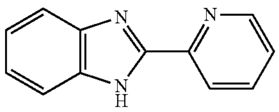

Formula 1C

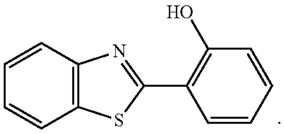

.

EXAMPLES

This disclosure describes electret filter media that comprises a fibrous web. The electric webs include a thermoplastic resin such as polypropylene (PP) and melt processable charge-enhancing additive compositions. The melt additive compositions comprise at least one component or mixtures of the additives in Table-1.

Charge Additives and Polypropylene (PP) Resin

The additives used in this invention are commercially available. The detailed information about each additive is tabulated in Table-1. The PP resin used in this invention for making webs is commercially available and was primarily used as received from the vendor.

TABLE 1

| Polypropylene Resin and Charging Additives Information | | | |
|---|---|---|---|
| Material No. | Code Name | Chemical Structure | Description and Company |
| 1 | CA-1 | 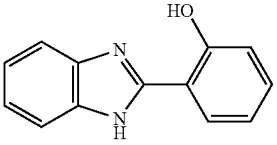 [SMILES: Oc1ccccc1-c1nc2ccccc2[nH]1] | CAS: 2963-66-8 2-(2-Hydroxyphenyl)-1H-benzimidazole Aldrich |
| 2 | CA-2 | 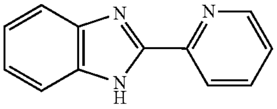 [SMILES: c1ccc(-c2nc3ccccc3[nH]2)nc1] | CAS: 1137-68-4 2-(2-Pyridyl) benzimidazole Alfa Aesar |
| 3 | CA-3 | 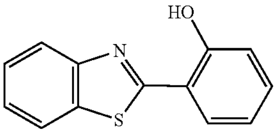 [SMILES: Oc1ccccc1-c1nc2ccccc2s1] | CAS: 3411-95-8 2-(2-Hydroxyphenyl) benzothiazole Alfa Aesar |
| 4 | CA-4 | 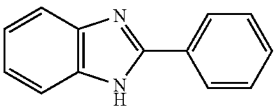 [SMILES: c1ccc(-c2nc3ccccc3[nH]2)cc1] | CAS: 716-79-0 2-Phenylbenzimidazole Alfa Aesar |
| 5 | PP-1 | Polyproplyne PP650X | Melt Flow Index (MFI): 1200; LyondellBasell, TX |

Non-woven Sample Preparation

Step-A: Preparation of Melt-Blown Mierofiber (BMF) Webs:

Extrusion was performed generally as described in Van A. Wente, Superfine Thermoplastic Fibers, 48 INDUST. ENGN. CHEM., 1342-46 and Naval Research Laboratory Report 111437 (Apr. 15, 1954) via the extrusion method of using an extruder operating at a temperature of about 220° C. to 330° C. connected to a melt blowing die having 10 holes per centimeter (25 holes per inch) and 0.38 mm (0.015 in) diameter holes, BMF webs were formed having basis weights of about 45-70 $g/m^2$, effective fiber diameters of about 6.5-15 micrometers, solidifies of about 4-10%, and thicknesses of about 0.6-2.5 millimeters. Charging additives were fed directly into the extruder with the resin, either as dry powder or as the compounds containing 10-30 wt % additive concentrates. Table-2 summarizes the specific web characteristics and concentration(s) of charging additives for each of the Examples and Comparative Examples.

TABLE 2

The Compositions and Specific Characteristics of BMF Webs samples

| | Web Compositions | | | | | |
|---|---|---|---|---|---|---|
| Web No. | PP | Additive | Additive C % (wt) | Basis Weight (GSM) | Solidity (%) | EFD (μm) |
| 1 | PP-1 | None | 0.00 | 63.0 | 7.0 | 11.6 |
| 2 | PP-1 | None | 0.00 | 57.3 | 6.2 | 8.0 |
| 3 | PP-1 | CA-1 | 0.20 | 60.2 | 7.43 | 11.11 |
| 4 | PP-1 | CA-2 | 0.20 | 60.2 | 7.43 | 11.66 |
| 5 | PP-1 | CA-3 | 0.2 | 60.2 | 7.54 | 11.38 |
| 6 | PP-1 | CA-4 | 0.20 | 55.9 | 6.53 | 8.66 |

Step B Electret Preparation:

Samples of each BMF web prepared in Step A above were charged by the following charging method and procedures. The designated charging method applied to each of comparative examples and examples are tabulated in Table-3

Charging Method 1—Corona Charging:

The selected melt-blown webs prepared above were charged by DC corona discharge. The corona charging was accomplished by passing the web on a grounded surface under a corona wire source with a corona current of about 0.01 milliamp per centimeter of discharge source length at a rate of about 3 centimeters per second. The corona source was about 3.5 centimeters above the grounded surface on which the web was carried. The corona source was driven by a positive DC voltage.

Likewise, for each Comparative Example, a melt-blown web was prepared from the same grade of polypropylene as the corresponding Examples web, but no charge additive was added.

Step C—Antimicrobial Sample Preparation and Test Method

The standard test method of "Modified AATCC Method 100—Assessment of Antibacterial Finishes on Textile Materials" was used for the nonwoven webs performance test.

This method is used to evaluate the antibacterial activity of textile products treated with antibacterial finish, which is suitable for nonwoven hydrophobic fabric webs.

In this test, the nonwoven fabric webs made were cut into 1" squares, placed in petri plates. A $10^8$ CFU/mL (0.5 McF) bacterial suspension was diluted 1:100 into a saline agar slurry to achieve a $10^6$ CFU/mL inoculum and covered with cover slip. 500 ul of the inoculum was placed on each sample. Samples were incubated for 24 h at 37° C. Neutralization was done with 45 mL of D/E broth. Microorganism used in the tests were *S. aureus* ATCC 6538. Viable cell count of *S. Aureus* ATCC 6538 on BMF web after 24 hrs were measured.

Filtration Results of Example E1-E4 and Comparative Example C1-C2

For each Comparative Example, a blown microfiber (BMF) nonwoven web was extruded using the polymeric resin listed in the Table-1.

For each Example, the extruded blown microfiber (BMF) nonwoven web comprises the polypropylene resin listed in the Tab and one of the charging additives or a combination thereof listed in the Table-1.

The comparative examples and examples of non-woven webs were charged by the charging method-1. The quality factors (QFs) & charge retention are listed in the Table-3.

TABLE 3

Non-Woven Electret Examples and Comparative Examples

| | Sample compositions & Concentrations | | | | | | | |
|---|---|---|---|---|---|---|---|---|
| Ex. No. | Web No. | Resin Code | Charging Additive Code | Concentration (wt %) | $Q_0$ | $Q_3$ | $Q_3/Q_0$ | Charging Method |
| C-1 | 1 | PP-1 | — | — | 0.17 | 0.09 | 0.54 | 1 |
| | 2 | PP-1 | — | — | 0.18 | 0.11 | 0.59 | 1 |
| E-1 | 3 | PP-1 | CA-1 | 0.2 | 0.32 | 0.21 | 0.66 | 1 |
| E-2 | 4 | PP-1 | CA-2 | 0.2 | 0.34 | 0.27 | 0.80 | 1 |
| E-3 | 5 | PP-1 | CA-3 | 0.2 | 0.27 | 0.23 | 0.85 | 1 |
| E-4 | 6 | PP-1 | CA-4 | 0.2 | 0.30 | 0.24 | 0.78 | 1 |

Antimicrobial Results of Example E5-E7 and Comparative Example C3-C4

TABLE 4

Non-Woven Electret Anti-Microbial Examples and Comparative Examples

| | Sample compositions & Concentrations | | | | | | |
|---|---|---|---|---|---|---|---|
| Ex. No. | Web No. | Resin Code | Charging Additive Code | Concentration (wt %) | Log CFU/cm$^2$ @ t = 0 (hr) | Log CFU/cm$^2$ @ t = 24 (hr) | Log CFU Deduction |
| C-3 | 1 | PP-1 | — | — | 4.81 | 4.49 | 0.32 |
| C-4 | 6 | PP-1 | CA-4 | 0.2 | n/a * | 4.56 | −0.07 |
| E-5 | 3 | PP-1 | CA-1 | 0.2 | n/a * | 0.84 | 3.49 |

TABLE 4-continued

Non-Woven Electret Anti-Microbial Examples and Comparative Examples

| | | Sample compositions & Concentrations | | | | | |
|---|---|---|---|---|---|---|---|
| Ex. No. | Web No. | Resin Code | Charging Additive Code | Concentration (wt %) | Log CFU/cm$^2$ @ t = 0 (hr) | Log CFU/cm$^2$ @ t = 24 (hr) | Log CFU Deduction |
| E-6 | 4 | PP-1 | CA-2 | 0.2 | n/a * | 2.93 | 1.56 |
| E-7 | 5 | PP-1 | CA-3 | 0.2 | n/a * | 2.9 | 1.44 |

* The same quantities of microorganism *S. aureus* ATCC 6538 were added into the Comparative and Examples samples in the beginning of the tests @ t = 0 (hr)
CFU stands for Colony Forming Units, in the Table-4 the results were measured in Log (CFU/cm$^2$).

What is claimed is:

1. An electret web consisting of:

a thermoplastic resin consisting of polyolefin; polyvinyl chloride; polystyrene; polycarbonate; or polyester; and a charge-enhancing additive consisting of substituted-benzimidazole compound with the general structure of Formula 1:

Formula 1

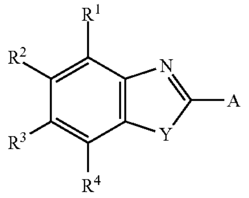

wherein the Y is an NH or S group;

the groups $R^1$, $R^2$, $R^3$, and $R^4$ independently are a hydrogen atom, an alkyl, an aryl, or a substituted alkyl; and A is a substituted 6-membered aromatic group or a substituted or unsubstituted heterocyclic aromatic 6-membered ring group; and wherein the electret web has anti-microbial properties.

2. The electret web of claim 1, wherein the web is a non-woven fibrous web.

3. The electret web of claim 1, wherein the web is a film.

4. The electret web of claim 1, wherein Y is NH; and the A group of Formula 1 is a 6-membered cyclic or heterocyclic aromatic group described by the general structure of Formula 2:

Formula 2

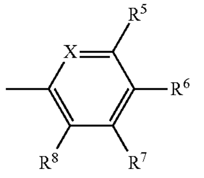

wherein X is: a —C—$R^9$ group, wherein $R^9$ is a hydroxy group; or a nitrogen atom; and each $R^5$, $R^6$, $R^7$, and $R^8$ independently is a hydrogen atom, an alkyl, an aryl, or a substituted alkyl.

5. The electret web of claim 1, wherein the charge-enhancing additive is a compound of Formula 1:

wherein Y is an S group; and the A group is a 6-membered aromatic group described by the general structure of Formula 2:

Formula 2

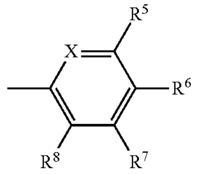

wherein X is: a —C—$R^9$ group, wherein $R^9$ is a hydroxy group; and each $R^5$, $R^6$, $R^7$, and $R^8$ independently is a hydrogen atom, an alkyl, an aryl, or a substituted alkyl.

6. The electret web of claim 1, wherein the charge-enhancing additive is a compound of Formula 1A, Formula 1B, or Formula 1C:

Formula 1A

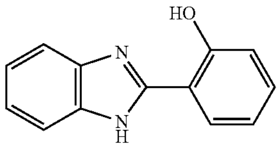

Formula 1B

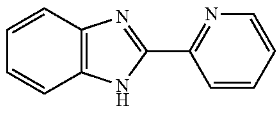

Formula 1C

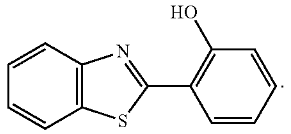

7. An electret filter medium consisting of:

a web consisting of:

a thermoplastic resin consisting of polyolefin; polyvinyl chloride; polystyrene; polycarbonate; or polyester; and a charge-enhancing additive consisting of a substituted-benzimidazole compound with the general structure of Formula 1:

Formula 1

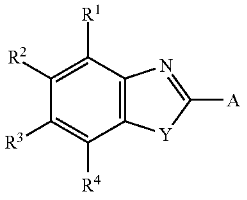

wherein the Y is an NH or S group;

the groups $R^1$, $R^2$, $R^3$, and $R^4$ each independently is a hydrogen atom, an alkyl, an aryl, or a substituted alkyl; and A is a substituted 6-membered aromatic group or a substituted or unsubstituted heterocyclic aromatic 6-membered ring group; and wherein the electret filter media has anti-microbial properties.

8. The electret filter medium of claim 7, wherein the charge-enhancing additive consisting of a compound of Formula 1:

wherein Y is an NH group; and the A group is a 6-membered aromatic group described by the general structure of Formula 2:

Formula 2

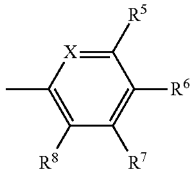

wherein X is: a —C—$R^9$ group, wherein $R^9$ is a hydroxy group;

or a nitrogen atom; and each $R^5$, $R^6$, $R^7$, and $R^8$ independently is a hydrogen atom, an alkyl, an aryl, or a substituted alkyl.

9. The electret filter medium of claim 8, wherein X is:

a —C—$R^9$ group, wherein $R^9$ is a hydroxy group; and each $R^5$, $R^6$, $R^7$, and $R^8$ independently is a hydrogen atom.

10. The electret filter medium of claim 8, wherein X is:

a nitrogen atom; and each $R^5$, $R^6$, $R^7$, and $R^8$ independently is a hydrogen atom.

11. The electret filter medium of claim 7, wherein the charge-enhancing additive is a compound of Formula 1:

wherein Y is an S group; and the A group is a 6-membered aromatic group described by the general structure of Formula 2:

Formula 2

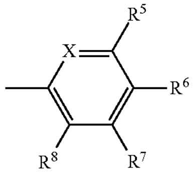

wherein X is: a —C—$R^9$ group, wherein $R^9$ is a hydroxy group;

and each $R^5$, $R^6$, $R^7$, and $R^8$ independently is a hydrogen atom, an alkyl, an aryl, or a substituted alkyl.

12. The electret filter medium of claim 7, wherein the charge-enhancing additive is 0.02-5.0% by weight of the web.

13. The electret filter medium of claim 7, wherein the web contains an electrostatic charge, wherein the charge is imparted through corona treatment, hydrocharging, or a combination thereof.

14. The electret filter medium of claim 7, wherein the filter medium retains at least 65% filtration performance as measured by Quality Factor after aging for 72 hours at 71° C.

15. The electret filter medium of claim 7, wherein the charge-enhancing additive is at least one compound of Formula 1A, Formula 1B, or Formula 1C:

Formula 1A

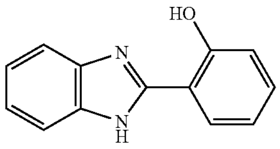

Formula 1B

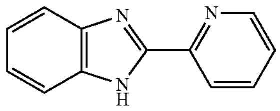

Formula 1C

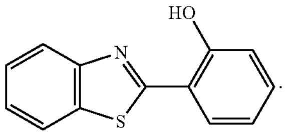

* * * * *